United States Patent
Shibata et al.

(10) Patent No.: US 7,444,819 B2
(45) Date of Patent: Nov. 4, 2008

(54) GAS TURBINE INSTALLATION INCLUDING A COMPRESSED AIR HUMIDIFIER AND METHOD

(75) Inventors: Takanori Shibata, Hitachinaka (JP); Shinya Marushima, Hitachinaka (JP); Nobuaki Kizuka, Hitachinaka (JP); Hidefumi Araki, Hitachi (JP); Shigeo Hanamiya, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 403 days.

(21) Appl. No.: 10/950,531

(22) Filed: Sep. 28, 2004

(65) Prior Publication Data
US 2005/0066664 A1    Mar. 31, 2005

(30) Foreign Application Priority Data
Sep. 30, 2003  (JP) .............................. 2003-339048

(51) Int. Cl.
*F02C 3/30* (2006.01)
(52) U.S. Cl. .............................. 60/775; 60/728; 60/39.3
(58) Field of Classification Search .................. 60/775, 60/728, 39.3, 39.59, 39.53, 39.83
See application file for complete search history.

(56) References Cited

U.S. PATENT DOCUMENTS

| | | | | |
|---|---|---|---|---|
| 5,507,141 | A * | 4/1996 | Stigsson | 60/775 |
| 5,782,080 | A * | 7/1998 | Illbruck | 60/39.59 |
| 6,389,799 | B1 * | 5/2002 | Hatamiya et al. | 60/39.3 |
| 6,397,578 | B2 * | 6/2002 | Tsukamoto et al. | 60/39.511 |
| 6,560,957 | B2 | 5/2003 | Hatamiya et al. | |
| 6,578,354 | B2 | 6/2003 | Hatamiya et al. | |
| 6,598,401 | B1 * | 7/2003 | Utamura | 60/775 |
| 6,637,185 | B2 | 10/2003 | Hatamiya et al. | |
| 6,644,013 | B1 * | 11/2003 | Hatamiya et al. | 60/39.511 |
| 6,644,035 | B1 | 11/2003 | Yamanaka et al. | |
| 6,981,360 | B2 * | 1/2006 | Yagi et al. | 60/39.5 |
| 7,096,659 | B1 * | 8/2006 | Hatamiya et al. | 60/39.5 |
| 2001/0020360 | A1 * | 9/2001 | Tsukamoto et al. | 60/39.53 |
| 2001/0022078 | A1 * | 9/2001 | Horii et al. | 60/39.182 |
| 2002/0026783 | A1 * | 3/2002 | Utamura | 60/39.01 |
| 2002/0083712 | A1 * | 7/2002 | Tomlinson et al. | 60/775 |

(Continued)

FOREIGN PATENT DOCUMENTS

JP    62-026329    2/1987

(Continued)

OTHER PUBLICATIONS

G.J. Van Fossen, "The Feasibility of Water Injection into the Turbine Coolant to Permit Gas Turbine Contingency Power for Helicopter Application", Transactions of the ASME, 83-GT-66, Mar. 1983.

*Primary Examiner*—William H Rodriguez
(74) *Attorney, Agent, or Firm*—Mattingly, Stanger, Malur & Brundidge, P.C.

(57) ABSTRACT

A gas turbine installation is provided in which turbine cooling air can be humidified with water while suppressing deterioration of the reliability of turbine blades. The gas turbine installation comprises a compressor for compressing air, a combustor for burning compressed air and fuel, a turbine driven by combustion gas, and a humidifier for humidifying the compressed air extracted from an intermediate stage or a discharge section of the compressor. The compressed air humidified by the humidifier is used as turbine cooling air. The humidifier includes a water distributor for adjusting an amount of water added to the compressed air.

15 Claims, 6 Drawing Sheets

U.S. PATENT DOCUMENTS

| | | | |
|---|---|---|---|
| 2003/0196439 A1* | 10/2003 | Utamura | 60/775 |
| 2004/0060296 A1* | 4/2004 | Koganezawa et al. | 60/728 |
| 2004/0112037 A1* | 6/2004 | Yagi et al. | 60/39.3 |
| 2005/0011180 A1* | 1/2005 | Hatamiya et al. | 60/39.511 |
| 2007/0017227 A1* | 1/2007 | Horiuchi et al. | 60/775 |
| 2007/0113561 A1* | 5/2007 | Bolis et al. | 60/775 |

FOREIGN PATENT DOCUMENTS

| | | |
|---|---|---|
| JP | 2-264127 | 10/1990 |
| JP | 4-214931 | 8/1992 |
| JP | 9-178369 | 7/1997 |
| JP | 2002-138852 | 5/2002 |
| JP | 2003-65072 | 3/2003 |

* cited by examiner

MAIN STREAM

GAS TURBINE INSTALLATION INCLUDING A COMPRESSED AIR HUMIDIFIER AND METHOD

BACKGROUND OF THE INVENTION

1. Field of the Invention

The present invention relates to a gas turbine installation in which turbine cooling air is cooled with latent heat absorbed in evaporation of sprayed water droplets.

2. Description of the Related Art

Generally, in a gas turbine installation employing a part of compressed air generated from a compressor as turbine cooling air, an improvement in power generation efficiency and an increase in output of a gas turbine system can be achieved by increasing a cooling capability of cooling air and reducing the amount of compressed air required for the cooling. To that end, a technique for reducing the flow rate of compressed air required for cooling blades is practiced which employs a heat exchanger disposed midway an extraction pipe extending from the compressor, for example, to cool the turbine cooling air.

Also, a paper 83-GT-66 of ASME (American Society of Mechanical Engineers), i.e., Non-Patent Reference 1; ASME, 83-GT-66, discusses feasibility of a technique for spraying water droplets into the turbine cooling air and lowering the temperature of the turbine cooling air with latent heat absorbed in evaporation of the sprayed water droplets. This paper also discloses that the combustion temperature in a combustor is temporarily raised to increase the output of a gas turbine, and water is sprayed into the turbine cooling air for the purposes of increasing the blade cooling capability and maintaining the reliability of blades.

SUMMARY OF THE INVENTION

In the related art described above, because of water droplets being simply sprayed into the turbine cooling air, even when the turbine system is designed so as to allow evaporation of liquid water in a cooling air passage of a turbine blade, impurities contained in the water are precipitated in the cooling air passage and scale is generated. As a result, the cooling capability for the turbine blade is reduced and a heat spot is generated, whereby the blade reliability possibly deteriorates.

It is an object of the present invention to provide a gas turbine installation in which turbine cooling air can be humidified while suppressing deterioration of the reliability of turbine blades.

To achieve the above object, the present invention provides a gas turbine installation comprising a compressor for compressing air, a combustor for burning air compressed by the compressor and fuel, a turbine driven by combustion gas produced from the combustor, and a humidifier for humidifying the compressed air extracted from an intermediate stage or a discharge section of the compressor, the compressed air humidified by the humidifier being used as turbine cooling air, wherein the humidifier includes a water distributor for adjusting an amount of water added to the compressed air. Also, the water distributor distributes water in excess of an amount by which the water is evaporated into the compressed air passing through the humidifier.

According to the present invention, a gas turbine installation can be provided in which the turbine cooling air can be humidified while suppressing deterioration of the reliability of turbine blades.

DESCRIPTION OF THE PREFERRED EMBODIMENTS

Embodiments of the present invention will be described below with reference to the drawings.

First Embodiment

Figure 1:
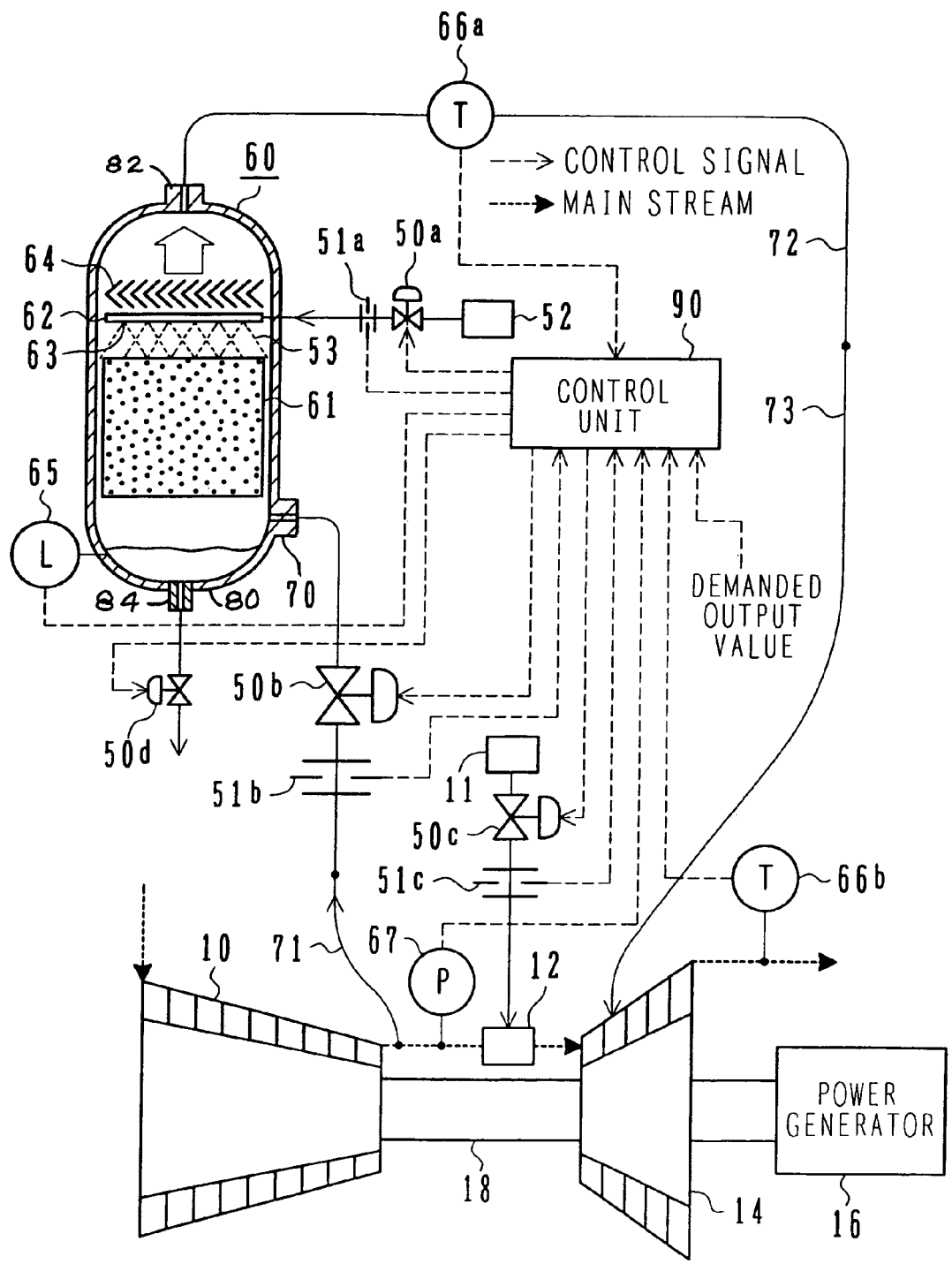
FIG. 1 shows a gas turbine installation according to a first embodiment of the present invention.

FIG. 1 is a schematic view of a gas turbine installation according to a first embodiment of the present invention. As shown in FIG. 1, a gas turbine power generating installation comprises a compressor 10 for compressing and delivering air, a combustor 12 for burning compressed air, which is obtained through compression in the compressor 10, and fuel 11 and then producing combustion gas, a turbine 14 driven by the combustion gas produced from the combustor 12, and a humidifier 60 for extracting and humidifying a part of the compressed air from the compressor 10 and supplying the humidified compressed air as turbine cooling air. A power generator 16 for receiving motive power from an output shaft of the gas turbine and converting the motive power into electric power is connected to a transmission system (not shown). Note that auxiliaries such as pumps are omitted from the drawing.

Figure 2:
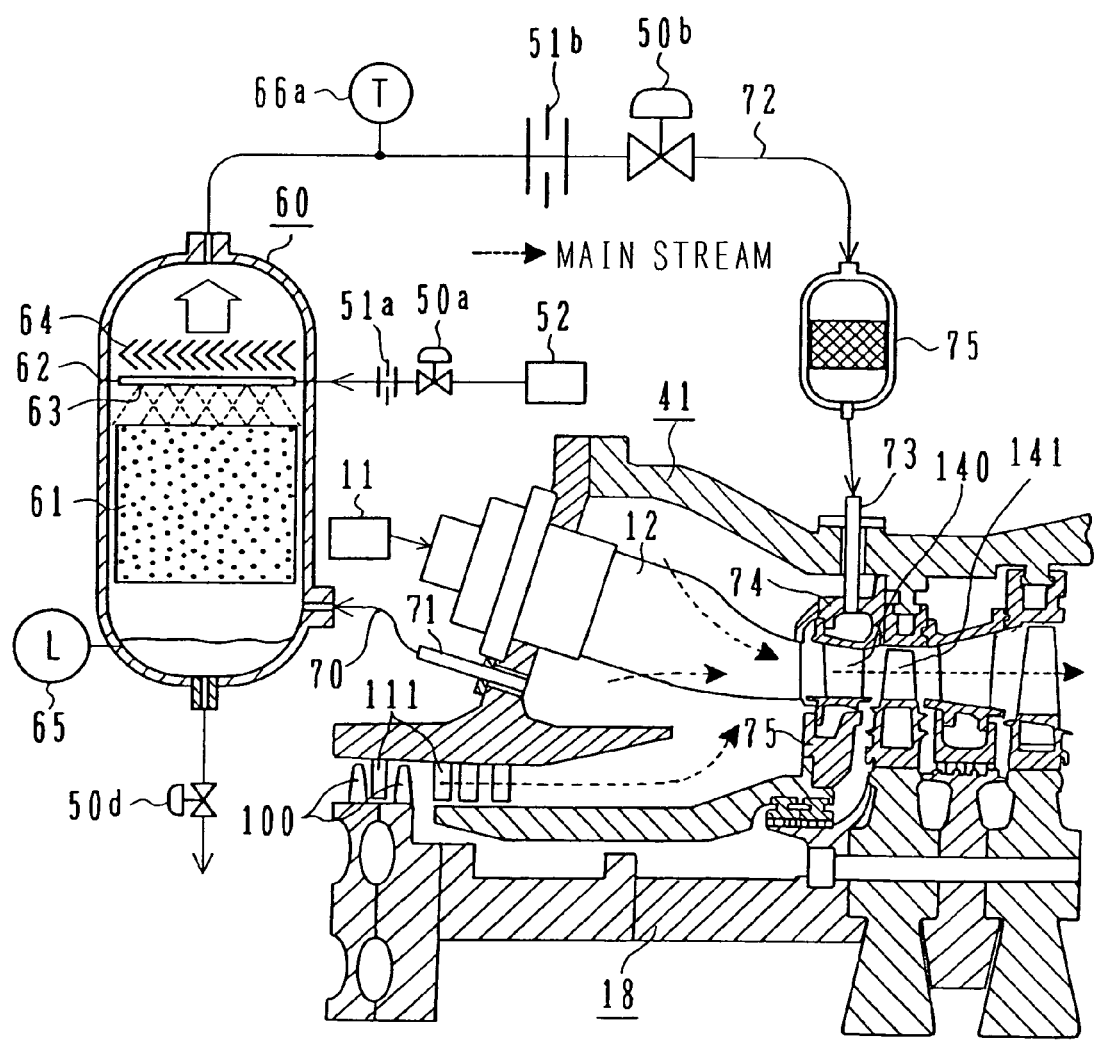
FIG. 2 shows details of a joint section between a gas turbine and a humidifier, and a structure of the humidifier according to a second embodiment of the present invention.

FIG. 2 shows details of a joint section between the gas turbine (exactly speaking, a part of the gas turbine) and the humidifier 60. The compressed air having passed rotor blades 100 and stator blades 111 of the compressor 10 flows into the combustor 12 where the air is mixed with the fuel 11 and then burnt. Thereafter, the produced combustion gas passes turbine stator blades 140 and turbine rotor blades 141 and is discharged as exhaust gas to the atmosphere. On that occasion, energy of the combustion gas is recovered by the turbine rotor blades 141 and is transmitted to the compressor rotor blades 100 through a rotor system 18 so that the recovered energy is utilized as compression work to produce the compressed air.

In the construction shown in FIG. 2, an extraction piping system 71 is provided in a portion of a casing 41 near the combustor 12 to extract an air stream externally of the combustor 12, i.e. air having been delivered from the compressor 10. The extraction is delivered to the humidifier through an inlet 70 thereof. However, the extraction piping system 71 is not necessarily provided in a discharge section of the compressor, but it may be provided in an intermediate stage of the compressor on the lower pressure side depending on the pressure in a turbine area to which the cooling air is sent. The humidified air is discharged from the humidifier through an outlet 82 at an upper end there.

Also, in the construction of FIG. 2, a distribution system 73 for distributing the cooling air to the interior of the turbine blade penetrates through the casing 41 and is connected to a turbine inner casing 74. The turbine stator blade 140 is fixed to the inner casing 74, and the cooling air supplied to the interior of the inner casing 74 passes the interior of the turbine stator blade 140 to cool it. After cooling the blade, the cooling air passes, e.g., cooling holes formed in a blade surface and gaps between the blade and the turbine inner casings 74, 75 each serving as a support member, and then merges with a main stream gas, followed by being discharged to the atmosphere. The cooling route of the cooling air and the method of mixing the cooling air with the main stream gas and discharging them are not limited to the above-described ones, but any other suitable route and/or method can be used depending on the blade cooling mode. While this embodiment is illustrated as supplying the humidified air to only the initial-stage stator blade 140, the humidified air may also be used for cooling the initial-stage rotor blade 141 and other-stage blades. As an alternative, the humidified cooling air may be used for multistage blade cooling, for example, such that the cooling air having finished cooling of the initial-stage stator blade 140 is further employed to cool the initial-stage rotor blade 141.

While each of the extraction piping system 71 and the distribution system 73 shown in FIGS. 1 and 2 is basically made of a pipe arrangement, a manifold may be disposed midway the piping for the sake of easier mounting work. Moreover, an expandable joint may be disposed midway the distribution system 73 in consideration of a difference in thermal expansion between the casing 41 and the inner casing 74.

The construction of the humidifier 60 for humidifying the turbine cooling air will be described below with reference to FIG. 1. Inside the humidifier 60, a water distributor 62 for uniformly distributing water 52 into the compressed air is installed to supply liquid water 53 through jet holes 63. A packing 61 filled in the humidifier 60 further disperses the liquid water 53 for promotion of contact between the water and the compressed air. The contact between the water and the compressed air causes a part of the liquid water to evaporate into the compressed air. At this time, the amount of heat corresponding to latent heat required for the evaporation is absorbed from the compressed air, whereby the compressed air is cooled.

Most of the water having not evaporated in the humidifier 60 is pooled at the bottom 80 of the humidifier 60, and a level of the pooled water is managed by, e.g., a water gauge 65. When the water level rises, the pooled water is discharged to the exterior of the humidifier 60 through, e.g., a drain hole 84 provided in the bottom portion and a valve 50*d*. In this embodiment, a signal from the water gauge 65 is received by a control unit 90, and the valve 50*d* is opened to adjust the water level when the water gauge 65 shows an excessively high water level. Instead of providing the water gauge 65, the humidifier 60 may have a structure having a drain hole such that water exceeding a certain level overflows. Additionally, a liquid droplet eliminator 64 is installed in an upper portion of the humidifier 60 to prevent liquid (water) droplets entrained with an air stream from being supplied to the interior of the turbine blade.

For the humidified compressed air, the mass flow rate is measured by, e.g., a mass flowmeter 51*b* and the temperature is measured by, e.g., a thermometer 66*a*. The flow rate of the turbine cooling air is controlled by, e.g., a flow adjusting valve 50*b* depending on those measured mass flow rate and temperature, the operation status of the gas turbine itself, etc. The mass flowmeter 51*b* and the flow adjusting valve 50*b* may be disposed downstream of the humidifier 60 instead of the upstream. Also, instead of employing the mass flowmeter 51*b*, the mass flow rate of the compressed air may be indirectly determined, for example, from the volume flow rate, temperature and pressure thereof. Further, while the thermometer 66*a* for the cooling air is installed downstream of the humidifier 60 for determining the air temperature after the humidification, the air temperature upstream of the humidifier 60 may be measured and the air temperature after the humidification may be indirectly determined from the measured temperature and the amount of water added from the water distributor 62.

With this embodiment, by adding the water to the compressed air used for cooling of the turbine and humidifying the same, the cooling capability of the turbine cooling air can be increased with an increase in not only the cooling effect due to evaporation of the water, but also in heat transfer rate due to mixing of water vapor. It is therefore possible to greatly reduce the amount of the cooling air required for maintaining the soundness of the turbine blade, and to increase the amount of the compressed air effectively used for the combustion, thus resulting in a larger output and higher efficiency of power generation. Further, since the presence of water vapor contained in the cooling air is also effective to increase the heat capacity of the cooling air, a temperature rise resulting from receiving heat is smaller than the compressed air that is at the same temperature, but has a lower moisture content, and a higher cooling capability can be obtained. As a result, a rate in cutting the required amount of the cooling air and the efficiency of power generation can be both greatly increased in comparison with the method of just lowering the temperature of the cooling air by using a heat exchanger, for example, without humidifying the cooling air.

Moreover, since the humidifying method using water in this embodiment employs the packing to promote evaporation of the water instead of simply spraying the water such as disclosed in the above-cited Non-Patent Reference 1; ASME, 83-GT-66, a larger amount of water can be evaporated in a shorter distance. In addition, the packing has the functions of inhibiting the liquid droplets from being entrained with the air stream, and of restraining the liquid droplets from being transferred to the interior of the turbine blade. It is therefore possible to prevent the liquid droplets from contacting with a high-temperature portion of the blade, and to avoid the blade from being damaged by thermal shock. Moreover, since water is not evaporated inside the blade, impurities in the water are prevented from being fixedly deposited as scale onto the high-temperature portion of the blade and the blade reliability can be maintained for a long term.

In an ordinary gas turbine installation, the temperature of the compressed air near an outlet for the compressed air is not lower than about 300° C., and the relative humidity is nearly 0%. In principle, water can be evaporated into the compressed air until the relative humidity of the compressed air reaches 100%. To that end, however, a sufficient contact area and a sufficient contact time between water and air are required. Also, the lower the relative humidity of the compressed air in contact with the liquid water, the more likely the liquid water evaporates into the air. The packing 61 in the humidifier 60 not only retards the falling speed of the liquid droplets, thereby prolonging the contact time between the liquid water and the air, but also forms a thin liquid film on the packing, thereby increasing the contact area between the liquid water and the air. The packing 61 can be prepared by irregularly packing a plurality of ring- or saddle-shaped small structures in the humidifier 60. As a result of the liquid water and the air flowing between the small structures in a turbulent condition, the liquid droplets can be prevented from being entrained with the air stream, and the effect of stirring the air and the liquid water can be increased. Accordingly, a larger amount of water can be evaporated into the compressed air with the packing having a relatively short length.

Further, a larger amount of water can be evaporated into the compressed air in a shorter distance by increasing the contact area between the liquid water and the air with the use of, as the packing, a wettable material that allows water to permeate into it well. Examples of the wettable material include a wick material used in heat pipes, etc., a porous ceramic material, and a sintered metal. The use of such a wettable material enables water to uniformly permeate into the packing under the action of osmotic pressure, and provides a larger effect of increasing the contact area between the liquid water and the air. As a result, the size of the humidifier can be reduced.

In this embodiment, the water distributor 62 supplies water in excess of an amount by which the water can be evaporated during fall thereof through the packing. Stated another way, water is supplied from the water distributor 62 in excess of an amount by which the water is evaporated into the cooling air. Therefore, impurities in the water, which are less likely to evaporate than the water, remain in the water without being released (evaporated) into the air and are accumulated at the bottom of the humidifier 60 together with the liquid water.

Thus, in the past, even when the turbine system is designed so as to allow evaporation of liquid water in a cooling air passage of the turbine blade, impurities contained in the water are precipitated in the cooling air passage and scale is generated. As a result, the cooling capability for the turbine blade is reduced and a heat spot is generated, whereby the blade reliability possibly deteriorates. In contrast, because of the provision of the water distributor 62, this embodiment can inhibit impurities in the water from being mixed into the cooling air, and is free from a risk of clogging of the blade cooling passage with the impurities. Consequently, a gas turbine installation can be provided in which the turbine cooling air can be humidified while suppressing deterioration of the reliability of the turbine blade.

Also, since the impurities in the water remain in the liquid water and are discharged as a drain to the exterior of the humidifier 60 through the valve 50*d*, there is no need of using water with extremely high purity as the water 52 for humidification. As a result, the treatment cost for the supplied water is reduced and the running cost can be cut.

Further, although the bottom of the humidifier 60 is heated by the compressed air supplied through the extraction piping system 71, the presence of a water pool at the bottom of the humidifier 60 avoids the humidifier bottom from being heated up to a level higher than the water boiling point. If the water pool is not present, the liquid droplets contact with the bottom of the humidifier 60 heated up to temperatures higher than the water boiling point, thus resulting in a possibility of abrupt boiling and an incidental pressure variation in the cooling system. This embodiment can positively prevent the occurrence of such a problem with the presence of the water pool at the bottom of the humidifier 60.

Moreover, in this embodiment, at the startup of the gas turbine, the water distributor 62 starts the distribution of water before the temperature of the compressed air passing through the humidifier 60 reaches the water boiling point under the air pressure at that time. By thus supplying water to the humidifier 60 from a point in time at which the temperature of the compressed air is relatively low, to thereby form the water pool at the bottom of the humidifier 60, the humidifier 60 can be prevented from being heated up to a level higher than the water boiling point, and hence abrupt boiling in the humidifier can be avoided.

As mentioned above, the amount of water that can be evaporated into the compressed air strongly depends on the contact time and the contact area between water and air. Based on that dependent relation, in this embodiment, the height (i.e., the length in the direction of flow of the compressed air) of the packing 61 is adjusted such that the relative humidity of the compressed air at the outlet of the humidifier 60 is less than 95% in a rated operation state of the gas turbine. With that adjustment, even if the piping for the turbine cooling air is cooled several tens degrees by an external cold heat source such as the atmosphere, it is possible to prevent the amount of water vapor in the turbine cooling air from reaching a saturated humid air state, and to avoid liquid droplets from being generated due to condensation of water vapor in the turbine cooling air. Accordingly, deterioration of the reliability of the turbine blade can be avoided which would be otherwise caused with inflow of condensed liquid droplets.

The gas turbine installation of this embodiment includes the control unit 90 capable of adjusting the turbine inlet temperature at the rated rotational speed based on an adjustment of the flow rate of the fuel 11 such that the turbine inlet temperature rises as the flow rate of the turbine cooling air increases. Also, the gas turbine installation of this embodiment includes a flowmeter 51*c* for measuring the flow rate of the fuel and a flow adjusting valve 50*c* for adjusting the flow rate of the fuel. As an alternative, the flow rate of the fuel may be indirectly determined by a method of changing the supply pressure of the fuel to adjust the flow rate of the fuel, and calculating the flow rate of the fuel from the fuel supply pressure at that time. Further, in this embodiment, the turbine inlet temperature is calculated from the relationship between a pressure ratio and a temperature ratio based on the atmospheric pressure and both output values of a temperature gauge 66*b* for measuring the exhaust gas temperature of the gas turbine and a pressure gauge 67 for measuring the delivery pressure of the compressor. As another method, the turbine inlet temperature may be measured by employing a thermometer directly inserted in a turbine inlet portion.

The control unit 90 in this embodiment computes the cooling capability of the cooling air based on the temperature of the cooling air measured by the thermometer 66*a*, the mass flow rate of the cooling air measured by the mass flowmeter 51*b* and the amount of water added to the cooling air, and then estimates the turbine inlet temperature against which the turbine blade is endurable (hereinafter referred to as the "estimated heat endurable temperature"). When the current turbine inlet temperature is lower than the estimated heat endurable temperature, control is performed such that the flow rate of the fuel 11 is increased to make the turbine inlet temperature coincident with the estimated heat endurable temperature. Further, when the power generation output of the system resulting from that control is smaller than a demanded output value obtained as an external signal, the flow adjusting valve 50*b* for the turbine cooling air is opened to increase the flow rate of the cooling air. Then, the control unit estimates the turbine inlet temperature endurable by the turbine blade from the new increased flow rate of the cooling air and performs control again such that the flow rate of the fuel 11 is increased to make the turbine inlet temperature coincident with the newly estimated heat endurable temperature. Until the flow rate of the turbine cooling air reaches a design limit value or the power generation output of the system reaches the demanded output value, the above-mentioned control process is repeated to raise the turbine inlet temperature with an increase in the flow rate of the turbine cooling air. As a result of such control, even when the atmospheric temperature rises in, e.g., the summer season and the output of the gas turbine reduces, it is possible to temporarily increase the gas turbine output.

Additionally, a hygrometer may be disposed downstream of the humidifier 60 to more quickly and accurately confirm the amount of water vapor that has been evaporated into the cooling air. As an alternative, the amount of water vapor evaporated for humidification (i.e., the extent of humidification) may be indirectly estimated from the temperatures upstream and downstream of the humidifier 60. Any of those modifications enables the cooling capability of the turbine cooling air to be more accurately estimated.

Moreover, this embodiment includes a control circuit connected to a water flowmeter 51a and a water flow adjusting valve 50a both disposed in a water distribution system for the humidifier 60 so that the flow rate of the water 52 supplied to the humidifier can also be increased with an increase in the flow rate of the turbine cooling air. With such an arrangement, it is possible to not only increase the flow rate of the cooling air, but also to enhance the cooling capability of the cooling air as a result of lowering of the cooling air temperature and an increase in the amount of humid air. Consequently, the turbine inlet temperature can be raised while minimizing an increase in the flow rate of the cooling air. Thus, by simultaneously increasing the amount of the cooling air and the amount of the supplied water in such a way, the gas turbine output can be further increased without reducing the blade reliability and the power generation efficiency of the system.

Second Embodiment

FIG. 2 also shows a second embodiment of the present invention. The following description is made primarily of a different arrangement from that in the first embodiment of FIG. 1. In this second embodiment, a filter 75 for removing liquid droplets mixed in the cooling air is disposed near an outlet of a supply pipe 72. The filter 75 is desirably disposed as close as to a high-temperature component. With the provision of the filter 75, even when water vapor contained in the cooling air is condensed in a transient state or a partial load state due to heat radiation from the supply pipe 72 and throttling of the flow adjusting valve 50b, the condensed liquid droplets are prevented from being entrained with the cooling air into the cooling air passage in the blade and hence the blade reliability can be improved.

Third Embodiment

Figure 3:
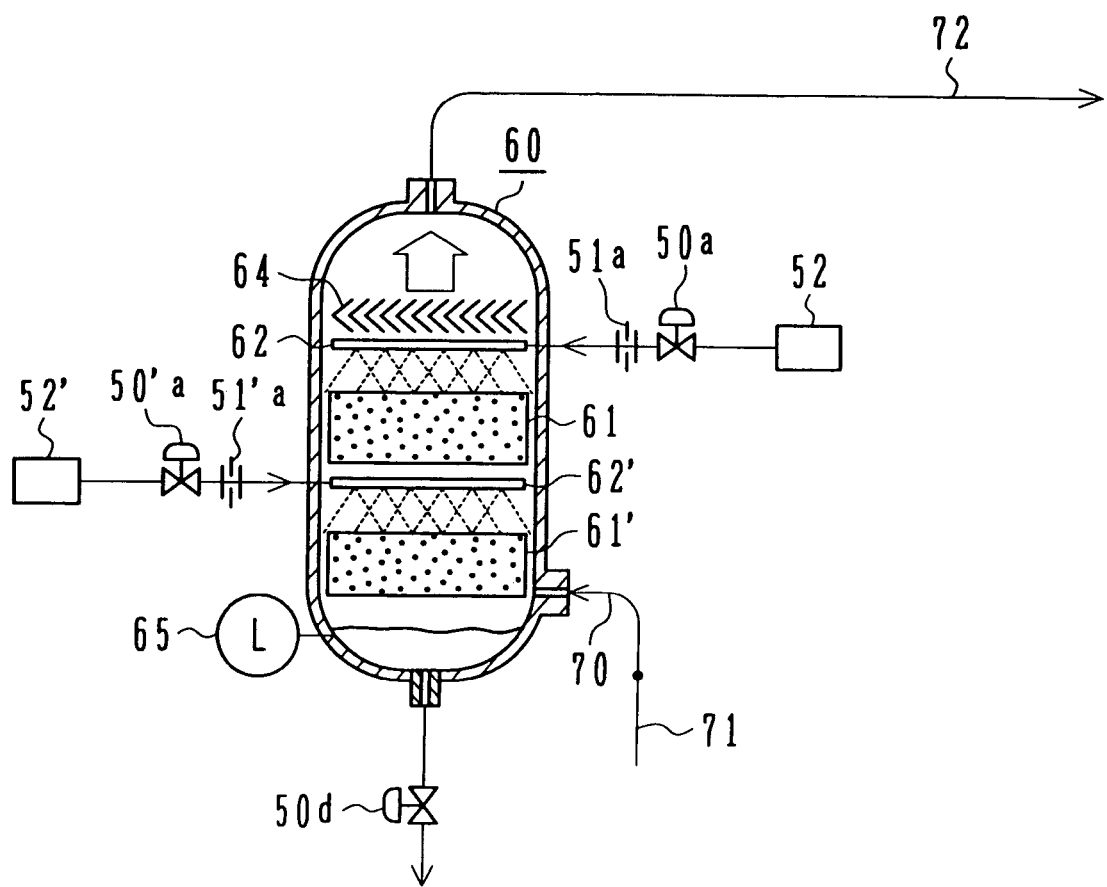
FIG. 3 shows a structure of the humidifier according to a third embodiment of the present invention.

FIG. 3 shows a third embodiment of the present invention. The following description is made primarily of a different arrangement from that in the embodiments mentioned above. In this third embodiment, the humidifier 60 is constructed in two stages of water distributors 62, 62' and packings 61, 61'. The compressed air fed through the extraction piping system 71 is supplied to the humidifier 60 through a bottom portion of the lower packing 61' via a pipe 70. Water distributed from the upper water distributor 62 passes through both the packings 61, 61' while continuing evaporation, and the water having not evaporated is pooled at the bottom of the humidifier 60. Water distributed from the lower water distributor 62' passes through only the packing 61', and the water having not evaporated is pooled at the bottom of the humidifier 60. Accordingly, the water distributed from the upper water distributor 62 falls down through both the packings 61, 61' while contacting with the compressed air for a longer time than the water distributed from the lower water distributor 62'. Hence, the water distributed from the upper water distributor 62 is more likely to evaporate into the compressed air than the water distributed from the lower water distributor 62'.

In the case of one stage of the water distributor and the packing as shown in FIG. 1, the fall distance of the distributed water cannot be adjusted depending on the desired extent of humidification. Therefore, shortening the contact time between the liquid water and the compressed air to reduce the extent of humidification means that the liquid water is completely evaporated on the packing surface during a fall through the packing. Accordingly, impurities in the water are deposited on the packing surface, thus resulting in a possibility that the maintenance cost of the packing is increased. In this embodiment, since the water distributor and the packing are constructed in multiple stages, the contact time between the liquid water falling through the packing and the compressed air can be adjusted while ensuring that a certain amount of drain water is maintained. With that feature, it is possible to cut the maintenance cost of the packing and to greatly enlarge an allowable range where the relative humidity of the compressed air at the humidifier outlet is variable. Even in a situation where the amount of the cooling air is reduced, such as occurred at the startup or the partial load state of the gas turbine, therefore, the relative humidity can be maintained at a value not higher than a certain level, and water can be avoided from condensing in any piping systems such as the cooling air supply pipe 72 and the cooling air distribution system 73.

Fourth Embodiment

Figure 4:
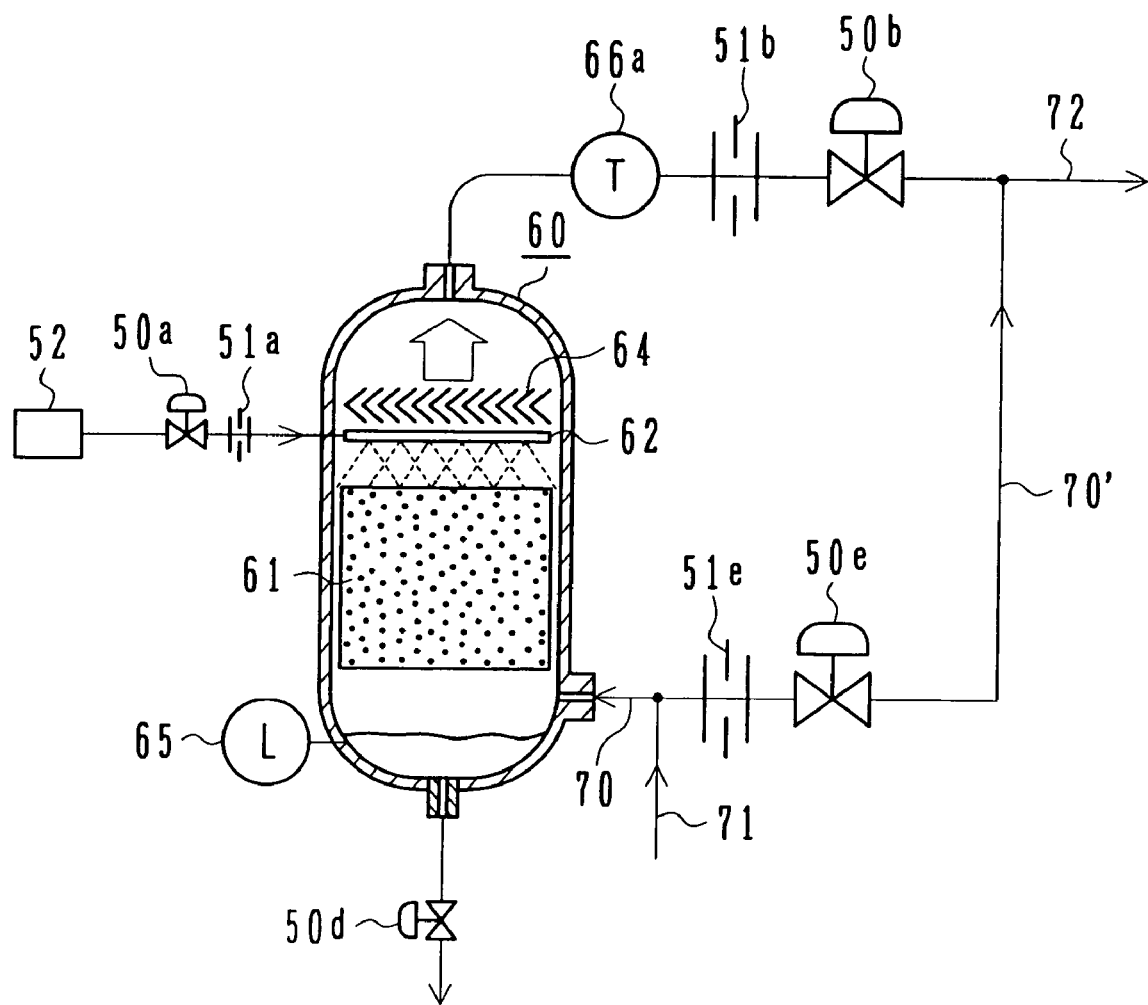
FIG. 4 shows a structure of the humidifier according to a fourth embodiment of the present invention.

FIG. 4 shows a fourth embodiment of the present invention. The following description is made primarily of a different arrangement from that in the embodiments mentioned above. In this fourth embodiment, a part of the compressed air supplied through the extraction piping system 71 passes through the humidifier 60 and is humidified. The remaining compressed air passes through a bypass line 70' bypassing the humidifier 60 and is then supplied to the cooling air supply pipe 72 for joining with the humidified compressed air. The flow rate of the compressed air passing through the bypass line 70' can be adjusted by a flow control valve 50e. Additionally, this embodiment includes flowmeters 51b, 51e and a thermometer 66a for measuring the flow rate and physical properties of the cooling air passing through the cooling air supply pipe 72.

By installing the bypass line 70' and the flow control valve 50e for controlling the flow rate of the compressed air passing through the bypass line 70', as shown in FIG. 4, the relative humidity of the compressed air passing through the supply pipe 72 can be adjusted over a wide range without adjusting the flow rate of the water 52 supplied to the humidifier 60. Even in a situation where the amount of the cooling air is reduced, such as occurred at the startup or the partial load state of the gas turbine, therefore, the above feature is effective to maintain the relative humidity at a value not higher than a certain level and to avoid condensation of water in the cooling air supply pipe 72, the cooling air distribution system 73, and so on.

Fifth Embodiment

Figure 5:
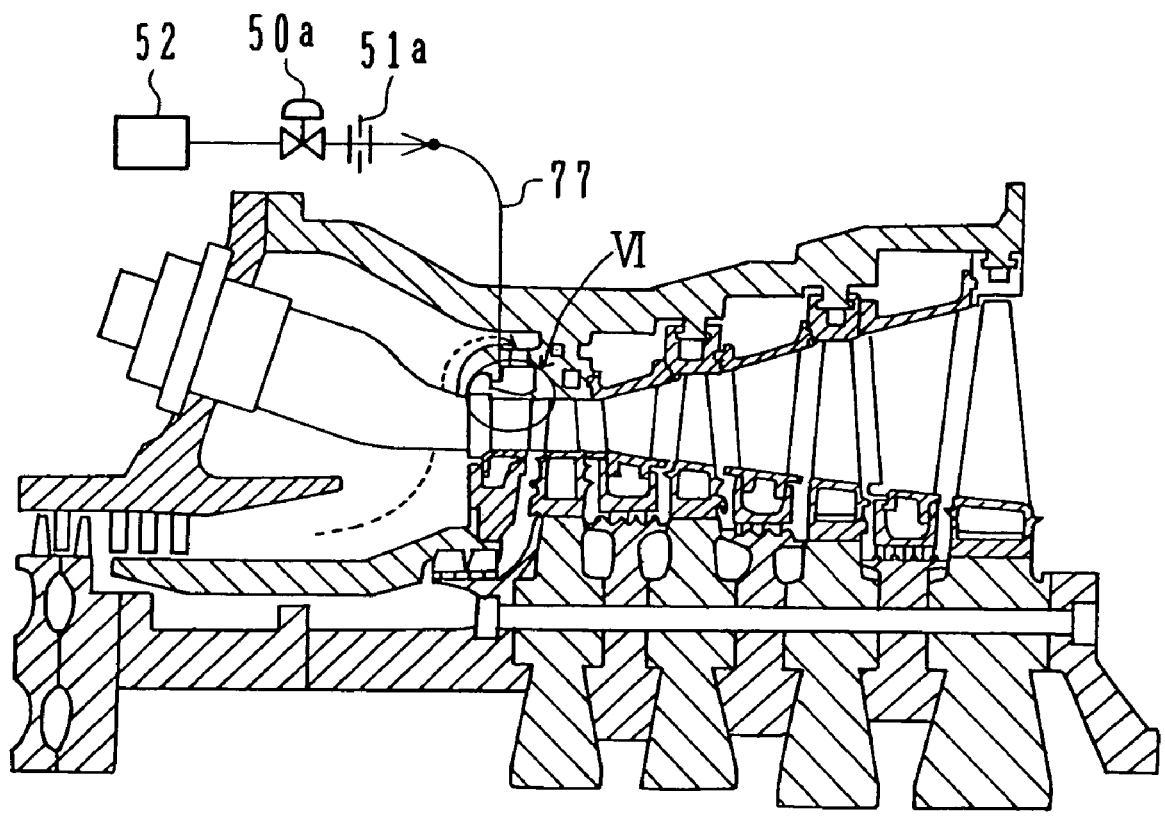
FIG. 5 shows a fifth embodiment in which an inner casing has a honeycomb structure made of a wettable porous material.
Figure 6:
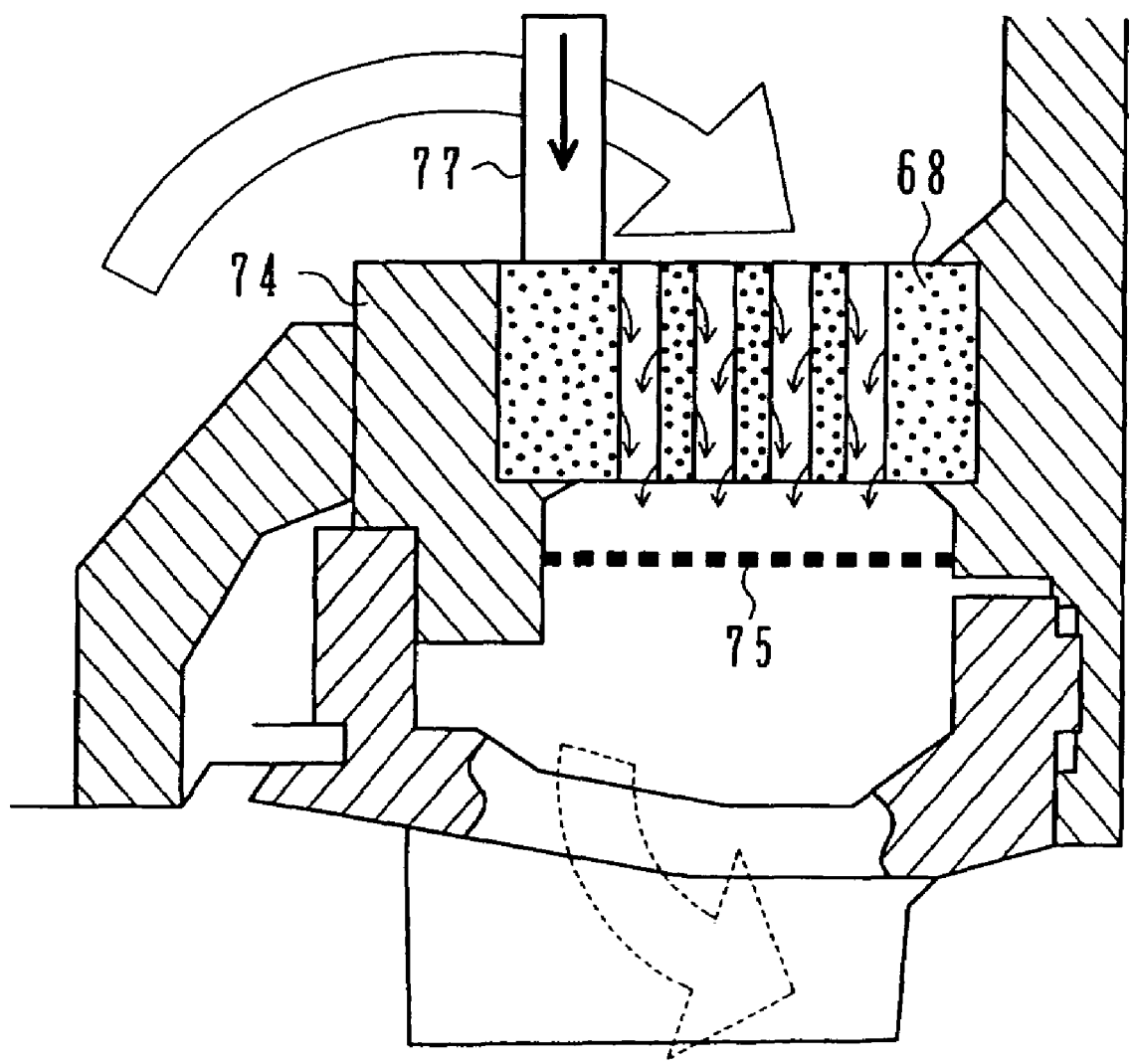
FIG. 6 shows an enlarged view of an area VI in FIG. 5.

FIG. 5 shows a fifth embodiment of the present invention, FIG. 6 shows an enlarged view of an area VI in FIG. 5. Instead of the humidifier 60 provided as a separate structure as shown in FIG. 2, the turbine inner casing 74 in this embodiment is partly formed into a honeycomb structure 68 made of a wettable porous material. Water is supplied to the wettable porous material through a pipe 77 from the exterior to humidify and cool the compressed air passing the vicinity of the honeycomb structure 68, thereby lowering the temperature of the turbine cooling air. In this embodiment, the water supplied through the pipe 77 is all evaporated into the compressed air through the wettable porous material. Accordingly, impurities in the water are deposited within the wettable porous material, i.e., the honeycomb structure 68. For that reason, pure water is desirably used as the water supplied through the pipe 77. In addition, a liquid droplet filter 75 is disposed downstream of the wettable porous material, i.e., the honeycomb structure 68, to prevent the supplied water from being entrained, as they are, with the compressed air into the turbine blade.

With such an arrangement, similarly to the other embodiments, higher efficiency and a larger output of the gas turbine can be achieved. An overall construction can be made more compact than the case of using the humidifier 60 as a separate structure, and hence the production cost can be cut.

What is claimed is:

1. A gas turbine installation comprising a compressor for compressing air, a combustor for burning air compressed by said compressor and fuel, a turbine driven by combustion gas produced from said combustor, and a humidifier for humidifying the compressed air extracted from a main stream of compressed air in an intermediate stage or a discharge section of said compressor, the compressed air humidified by said humidifier being used as turbine cooling air, wherein said humidifier includes a water distributor for adjusting an amount of water added to the compressed air, an inlet for the compressed air provided below said water distributor, and a bottom portion that is provided below said inlet and temporarily holds water added from said water distributor.

2. A gas turbine installation according to claim 1, which is configured so that said water distributor distributes an amount of water that is in excess of an amount at which the water is evaporated into the compressed air passing through said humidifier.

3. A gas turbine installation according to claim 1, wherein said humidifier includes a packing made of a wettable porous material.

4. A gas turbine installation according to claim 3, wherein said packing and said water distributor are installed in multiple spaced stages.

5. A gas turbine installation according to claim 1, which is configured so that at startup of said gas turbine, said water distributor starts distribution of water before the temperature of the compressed air passing through said humidifier reaches the water boiling point under air pressure at that time.

6. A gas turbine installation according to claim 1, further comprising means for controlling a flow rate of the compressed air passing through said humidifier.

7. A gas turbine installation according to claim 1, which is configured so that a part of the compressed air extracted from the intermediate stage or the discharge section of said compressor is separated and used as the turbine cooling air after being mixed with highly humidified air produced by said humidifier.

8. A gas turbine installation according to claim 1, which is configured so that said water distributor humidifies the compressed air such that the relative humidity of the turbine cooling air is less than 95% in a rated operation state of said gas turbine.

9. A gas turbine installation according to claim 1, wherein said gas turbine installation further comprises means for raising a turbine inlet temperature at a rated rotational speed, and control means for raising the turbine inlet temperature in match with an increase in a flow rate of the turbine cooling air.

10. A gas turbine installation according to claim 1, wherein said gas turbine installation further comprises control means for raising the turbine inlet temperature in match with an increase in a flow rate of the water distributed from said water distributor.

11. A gas turbine installation according to claim 10, wherein said control means includes means for controlling a flow rate of the fuel supplied to said combustor based on the flow rate and temperature of the turbine cooling air.

12. A gas turbine installation according to claim 1, wherein said gas turbine installation further comprises a filter for removing liquid droplets mixed in the cooling air, said filter being disposed in a supply pipe for supplying the turbine cooling air having been humidified by said humidifier.

13. A control unit for a gas turbine installation comprising a compressor for compressing air, a combustor for burning air compressed by said compressor and fuel, a turbine driven by combustion gas produced from said combustor, and a humidifier for humidifying the compressed air extracted from a main stream of compressed air in an intermediate stage or a discharge section of said compressor, the compressed air humidified by said humidifier being used as turbine cooling air, wherein said humidifier includes a water distributor for adjusting an amount of water added to the compressed air, an inlet for the compressed air provided below said water distributor, and a bottom portion that is provided below said inlet and temporarily holds water added from said water distributor, and wherein said control unit controls an amount of water added from said humidifier to be not smaller than an amount by which the water is evaporated into the cooling air passing through said humidifier.

14. A control method for a gas turbine installation comprising a compressor for compressing air, a combustor for burning air compressed by said compressor and fuel, a turbine driven by combustion gas produced from said combustor, and a humidifier for humidifying the compressed air extracted from a main stream of compressed air in an intermediate stage or a discharge section of said compressor, the compressed air humidified by said humidifier being used as turbine cooling air, said humidifier including a water distributor for adjusting an amount of water added to the compressed air, an inlet for the compressed air provided below said water distributor, and a bottom portion that is provided below said inlet and temporarily holds water added from said water distributor, wherein said control method has a step of controlling an amount of water added from said humidifier to be not smaller than an amount by which the water is evaporated into the cooling air passing through said humidifier.

15. A gas turbine installation comprising a compressor for compressing air, a combustor for burning air compressed by said compressor and fuel, a turbine driven by combustion gas produced from said combustor, and a humidifier for humidifying the compressed air extracted from a main stream of compressed air in an intermediate stage or a delivery section of said compressor, the compressed air humidified by said humidifier being used as turbine cooling air, wherein said humidifier includes an outlet for the compressed air humidified by said humidifier, a water distributor that is provided below said outlet and adjusts an amount of water added to the compressed air, a packing provided below said water distributor, an inlet for the compressed air provided below said packing, a bottom portion that is provided below said inlet and temporarily holds water added from said water distributor, and a drain hole provided in said bottom portion.

* * * * *